United States Patent
Hiemeyer et al.

(10) Patent No.: US 9,321,237 B2
(45) Date of Patent: Apr. 26, 2016

(54) EVACUATED SHEET MATERIAL FOR THERMAL INSULATION

(75) Inventors: Jochen Hiemeyer, Karlstadt (DE); Roland Caps, Kleinwallstadt (DE); Stefan Roth, Margetshöchheim (DE)

(73) Assignee: va-Q-tec AG (DE)

( * ) Notice: Subject to any disclaimer, the term of this patent is extended or adjusted under 35 U.S.C. 154(b) by 439 days.

(21) Appl. No.: 13/695,098

(22) PCT Filed: May 2, 2011

(86) PCT No.: PCT/EP2011/002169
§ 371 (c)(1),
(2), (4) Date: Feb. 20, 2013

(87) PCT Pub. No.: WO2011/134677
PCT Pub. Date: Nov. 3, 2011

(65) Prior Publication Data
US 2013/0149481 A1    Jun. 13, 2013

(30) Foreign Application Priority Data
Apr. 30, 2010   (DE) .......................... 10 2010 019 074

(51) Int. Cl.
*B32B 3/02* (2006.01)
*E04B 1/80* (2006.01)
(Continued)

(52) U.S. Cl.
CPC ... *B32B 3/02* (2013.01); *B32B 3/04* (2013.01); *B32B 3/12* (2013.01); *B32B 3/26* (2013.01); *B32B 3/266* (2013.01); *B32B 5/022* (2013.01);
(Continued)

(58) Field of Classification Search
CPC ...... E04B 1/803; Y02B 80/12; Y10T 428/231
USPC ...................................................... 428/69, 68
See application file for complete search history.

(56) References Cited

U.S. PATENT DOCUMENTS

| | | |
|---|---|---|
| 3,162,566 A | 12/1964 | Katz |
| 5,500,305 A | 3/1996 | Bridges et al. |

(Continued)

FOREIGN PATENT DOCUMENTS

| | | |
|---|---|---|
| DE | 100 585 66 | 2/2002 |
| DE | 10 2005 045 726 | 4/2007 |

(Continued)

*Primary Examiner* — Brent O'Hern
(74) *Attorney, Agent, or Firm* — Pandiscio & Pandiscio

(57) ABSTRACT

A sheet material for thermal insulation, comprising a flat core of an open-pored material having two parallel extending surfaces, and a circumferential region inter-connecting the surfaces; a first barrier film in contact with a first surface of the core and comprising a sealing layer, and a fully circumferential protrusion of the first barrier film; a flat filter material in contact with a second surface of the open-pored core and disposed oppositely first barrier film and providing a fully circumferential protrusion a second barrier film in contact with the outer face of the flat filter material and comprising at least one sealing layer facing the flat filter material, and a fully circumferential protrusion of said second barrier film; a sealing seam extending circumferentially along the protrusion of the two films and fixing the two films to each other; wherein the filter material is welded circumferentially into the sealing seam, and wherein the volume between the two barrier films and the sealing seam is sealed and evacuated; and method for producing the insulation sheet.

28 Claims, 3 Drawing Sheets

(51) Int. Cl.

| | | |
|---|---|---|
| *F16L 59/065* | (2006.01) | |
| *B32B 3/12* | (2006.01) | |
| *B32B 3/26* | (2006.01) | |
| *B32B 5/02* | (2006.01) | |
| *B32B 5/16* | (2006.01) | |
| *B32B 5/18* | (2006.01) | |
| *B32B 5/24* | (2006.01) | |
| *B32B 5/30* | (2006.01) | |
| *B32B 7/12* | (2006.01) | |
| *B32B 15/085* | (2006.01) | |
| *B32B 15/20* | (2006.01) | |
| *B32B 27/12* | (2006.01) | |
| *B32B 29/02* | (2006.01) | |
| *B32B 3/04* | (2006.01) | |

(52) U.S. Cl.
CPC ... *B32B 5/16* (2013.01); *B32B 5/18* (2013.01); *B32B 5/245* (2013.01); *B32B 5/30* (2013.01); *B32B 7/12* (2013.01); *B32B 15/085* (2013.01); *B32B 15/20* (2013.01); *B32B 27/12* (2013.01); *B32B 29/02* (2013.01); *E04B 1/803* (2013.01); *F16L 59/065* (2013.01); *B32B 2262/0253* (2013.01); *B32B 2262/0276* (2013.01); *B32B 2262/101* (2013.01); *B32B 2264/102* (2013.01); *B32B 2264/107* (2013.01); *B32B 2266/06* (2013.01); *B32B 2307/304* (2013.01); *B32B 2307/7242* (2013.01); *Y02B 80/12* (2013.01); *Y10T 428/163* (2015.01); *Y10T 428/231* (2015.01)

(56) References Cited

U.S. PATENT DOCUMENTS

2003/0129330 A1 * 7/2003 Alderman .................. 428/34.1
2011/0261122 A1 * 10/2011 Platt et al. ................... 347/88

FOREIGN PATENT DOCUMENTS

| EP | 1 557 249 | 7/2005 |
|---|---|---|
| WO | WO 2007/033836 | 3/2007 |

\* cited by examiner

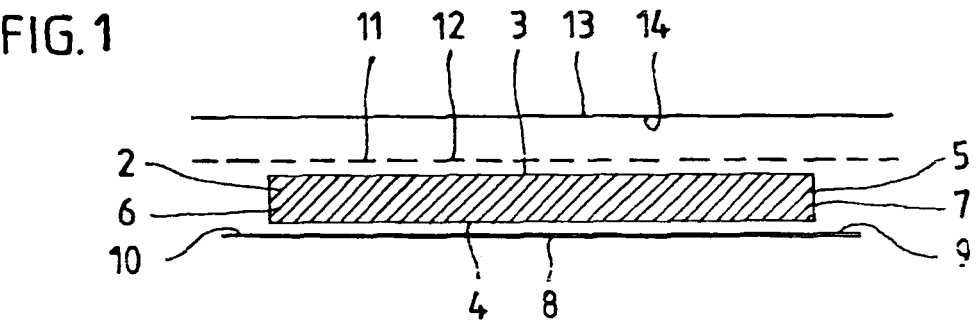
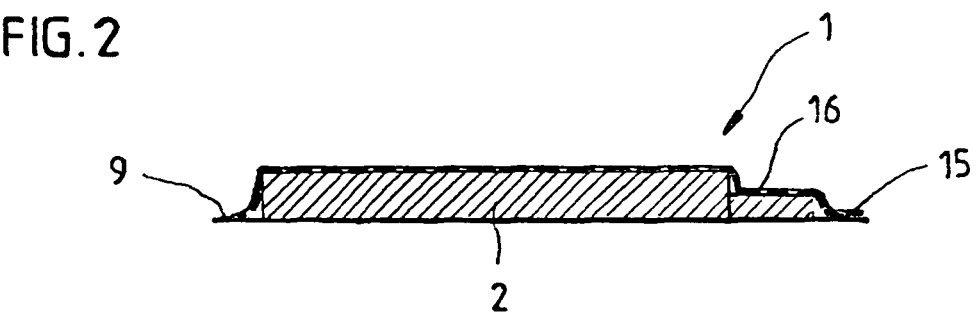
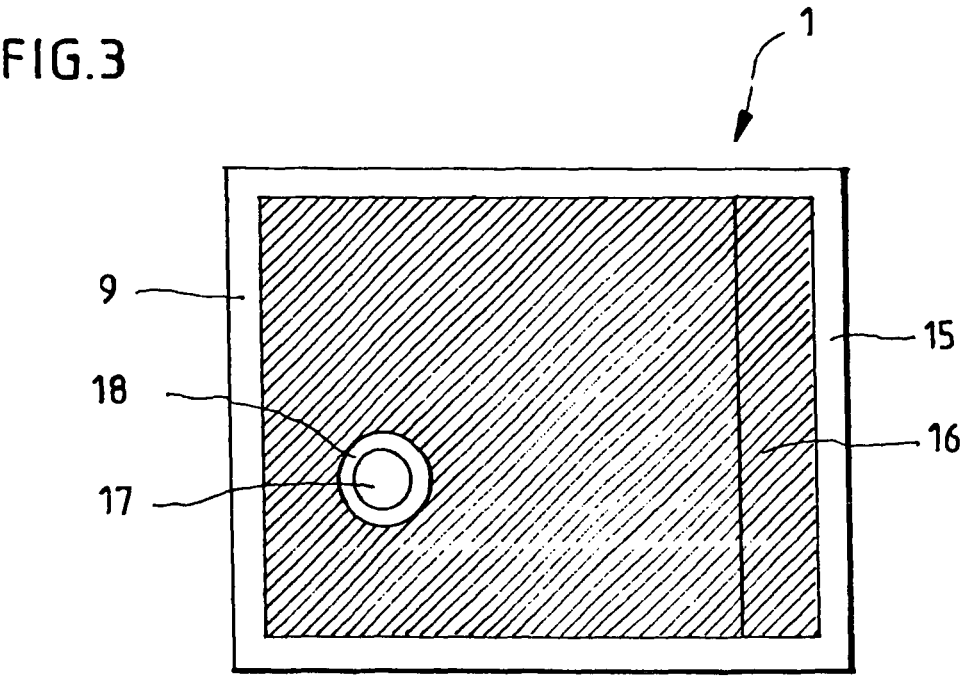

EVACUATED SHEET MATERIAL FOR THERMAL INSULATION

BACKGROUND OF THE INVENTION

1. Field of the Invention

The invention relates to an evacuated sheet material for thermal insulation, the sheet material comprising at least one flat core made of an open-pored material, a first barrier film in large-area contact with a first main surface of the core and having at least one sealing layer facing the core, a second barrier film encasing the core on its other main surface and having at least one sealing layer and a fully circumferential sealing seam along which the two barrier films are sealed to each other, wherein the volume between the two barrier films and the fully circumferential sealing seam is evacuated.

2. Description of the Prior Art

Evacuated insulating materials achieve thermal conductivities five to twenty times lower than those of ventilated, conventional insulating materials. They can be used, for example, to make very compact, high-insulating shipping containers for temperature-sensitive goods, high-insulating refrigeration and freezing equipment, or ultra-slim insulation systems for the building industry.

Suitable materials for the core of the evacuated insulation panels are compression resistant materials in the form of powder boards, powder fills, open-pore foams or glass fiber materials. In particular, to reduce dust, insulating cores consisting of powder boards or loose powder are usually wrapped in an air-permeable nonwoven polyester fabric of the kind described, for example, in DE 100 585 66. This keeps dust from being released during the evacuation process in the vacuum chamber and contaminating both the sealing seams and the vacuum chamber itself.

Core panels made of microporous silicic acid powder have a very fine pore structure and permit relatively high gas pressures without any consequences from the thermal conductivity of the residual gas. Thus, with these microporous materials, a vacuum of only 1 to 10 mbar is sufficient to lower the thermal conductivity to 0.004 to 0.005 W/mK. Envelopes of special high-barrier films with only an ultra-thin, vapor-deposited aluminum coating ensure that the gas pressure in the core material will increase only about one mbar per year. However, the manufacturing processes available to date for making powder-filled vacuum insulation panels are relatively elaborate and cannot be automated completely. One method that comes relatively close to meeting the requirements for automation is described in DE 10 2005 045 726, and includes the following method steps: a powder is filled into a high-barrier film bag, the shell of which has regions that will subsequently form the main surfaces of the finished flat insulation element, while a still-open region of the bag will subsequently form part of the perimeter of the finished flat insulation element; a filter material that is permeable to air, but impermeable to powdery dust, is fixed near the opening on the inner face of the film bag so that the inside of the bag is sealed dust-tight but still allows air to escape; the interior is evacuated; and finally, the bag is sealed in the evacuated state, the filter material ultimately being completely covered externally by the folded-together bag opening and thus being disposed entirely inside the bag, i.e., entirely inside the film envelope of the finished thermal insulation element.

During evacuation, the fine powders present can be completely retained in the bag, even under high gas flow rates, by the filter material disposed in the bag opening, so the evacuation chamber and the sealing seams do not become contaminated. The imperviousness of the finished thermal insulation element is still optimal, the filter material ultimately is completely covered by the film envelope. However, this method has the disadvantage that the evacuation process takes a relatively long time, since the suctioning can be done only through the narrow opening where the filter fabric is situated, which has a relatively small flow cross section. In addition, one-sided evacuation makes for a rather uneven distribution of powder over the surface of the panel.

SUMMARY OF THE INVENTION

From the disadvantages of the described prior art comes the problem initiating the invention, to further develop an evacuated sheet material for thermal insulation of a generic kind, so as to permit improved evacuation of the vacuum panel and arbitrary shaping of the edge and the surface structures, and so that the vacuum insulation element can be flexed without damaging the films.

This problem is solved by means of an evacuated sheet material, particularly by the fact that a flat filter material is in large-area contact with a second main surface of the core that is disposed oppositely from the first barrier film, a fully circumferential protrusion being maintained, wherein the second barrier film is in large-area contact with the outer face of the flat filter material, and wherein the filter material is welded fully circumferentially into the sealing seam between the two barrier films.

In the context of the present invention, the term "main surface" is to be understood as a complement to the term "perimeter," referring in both cases to a sheet material substantially defined by the shape of the core. The two main surfaces in this case are usually planar and approximately parallel to each other; in some cases the sheet material could also be curved, of course, in which case the two main surfaces would naturally be curved in a similar shape and would extend at an approximately constant distance from each other. Regardless, the two main surfaces are separated from each other by a fully circumferential perimeter surface. The width of this perimeter surface, hence the distance between the two main surfaces, is always smaller than the smallest dimension of a main surface. In the case of a rectangular main surface—i.e., particularly in the case of a cuboidal sheet material—the smallest dimension of a main surface is its width, whereas the smallest dimension of a square main surface is its edge length. For main surfaces of other configurations, one approach is to determine the smallest dimension, for example, by inscribing in the particular main surface a square having the maximal edge length and conforming to the curvature (if any) of the main surface; the edge length obtained is then simultaneously the value of the smallest dimension of the main surface. A main surface, particularly in the case of board-shaped sheet materials, therefore corresponds to the base area of the particular panel, and for all other forms of sheet materials, it should be possible in this way to determine the areas of the two main surfaces and that of the periphery connecting them. Generally speaking, the main surfaces are the two largest surfaces of a sheet material, which are the smallest distance apart.

Owing to the fact that—in contrast to the prior art—the filter material is in contact, not just with an end face or perimeter surface of the core, but with an entire main surface thereof, the evacuation of the thermal insulation element according to the invention can take place over the entire area of the nonwoven filter, thus ensuring a much more uniform distribution of powder over the surface and, moreover, also making it possible to deliberately create structures in the surface, e.g. steps of defined thicknesses.

To make such a thermal insulation element, the loose powder, or the powder board, is placed on a first barrier film and topped by the filter material. The filter material is connected at the edge, which follows the subsequent areal shape of the vacuum insulation element, to the first barrier film, thus creating for the powder a sealed volume that is nevertheless permeable to air and whose large area permits much more rapid evacuation than in the prior art. It is not provided, according to the invention, that the filter material be completely covered externally, but instead that it be sealed fully circumferentially into the sealing seam. The result, in the region of this sealing seam, is a three-layer structure having three directly adjacent layers: envelope film—filter material—envelope film. The filter material, as the middle component of this three-layer structure, passes all the way through the sealing seam, from the evacuated interior of the evacuated sheet material to the surrounding external space, which is under atmospheric pressure; i.e., it actually extends partially out of the evacuated region and thus forms part of the envelope at the sealing seam. There, of course, it is not merely the thin, and therefore air-permeable, extent of the filter material perpendicular to its base area that helps to create the seal, but also the filter material that is sealed in over the entire width of the sealing seam, and additionally bonds together with the material of the sealing layer there. The pressure differential between atmospheric pressure and the vacuum on the inside is therefore withstood by the entire width of the sealing seam. At the same time, it has been found, contrary to expectation, that this method of anchoring the filter material to the fully circumferential sealing seam causes the least warping in the region of the sealing seam and thus, on the whole, represents the most reliable and impervious variant, even though the inherently air-permeable filter material is generally unsuitable for use as an air-tight envelope. What is more, the filter material disposed between the two barrier films in the vicinity of the sealing seam completely separates the two barrier films from each other, and it is, therefore, precisely in the vicinity of the sealing seam that they are not in direct contact with each other, but are always separated. This intermediate layer, thus strengthened, substantially reduces the stress between the two barrier films, thereby further reducing the risk of cracks in a metallization layer and the leakage that would result.

It has been found to be advantageous for one barrier film to have a larger area than the other. Thus, whereas the smaller barrier film has an area $F_{B1}$, the other barrier film is $F_{B2}=F_{B1}+\Delta F$, where $\Delta F \neq 0$. Preferably:

$$\Delta F \geq \Delta F_{min} = \frac{1}{2} \cdot U \cdot D \cdot D/\ddot{U},$$

where U is the circumference of the core (or the total circumference of multiple cores), D is the thickness of the core (or of each core), and Ü is the width of the edgewise protrusion of the smaller film beyond the main surface of the core (or cores). This formula can therefore be used to determine, from the geometry of the core (or cores) and the blank of a film, the minimum blank size necessary for the other film so that neither of the two films need be overstretched as they are being welded around the core, i.e., so that the enclosed vacuum can be maintained over the long term.

The fact that the filter material has a larger surface area than the smaller barrier film and/or than the first barrier film disposed in large-area contact with the core results in a maximal filter area, thus ensuring optimal evacuation.

The surface area of the filter material is preferably the same as, or smaller than, the barrier film with which it is in direct, large-area contact. This measure ensures that the finished insulation panel will have a flush outer surface, since, on the one hand, the filter material does not lie in folds, and, on the other hand, it does not protrude appreciably beyond the outer edge of the welding tab.

According to another feature of the invention, the second barrier film, which is in large-area contact with the filter material, can be larger than the first barrier film, which is in large-area contact with the core.

Further advantages are gained if the difference between the surface areas of the two barrier films is equal to or greater than the circumference of the core, multiplied by 0.3 times its thickness. Such dimensioning eliminates the need to stretch one of the two films, and thus ensures that the barrier films remain gas-tight.

In the case of a thermal insulation element with more than one core, it has proven beneficial for the difference between the surface areas of the two barrier films to be equal to, or greater than, the sum of all the core circumferences, multiplied by approximately 0.3 times the core thickness. This measure makes it possible to weld a plurality of cores between two barrier films without stretching or even damaging one of the two films in the process.

As a result of the film dimensioning according to the invention, a cross section through a core wrapped in the barrier film is approximately hat-shaped. Since, under those conditions, a fully circumferential welding tab is shifted into the plane of a main surface of the insulation panel, in the manner of a hat brim, in the ideal case it does not abut the end face of an adjacent panel, but can, for example, be slid behind a main surface thereof. This yields the advantageous effect that two such panels can be laid snugly against each other. When relatively large areas are to be laid, this feature can be utilized by orienting the front sides of arealy adjacent panels so that they face alternately frontward and backward. The panels can also be laid as a composite surface if their corners are cut off, preferably in the form of triangular sections.

For this purpose, it is helpful if all portions of the circumferential sealing seam lie in a common plane, particularly if the common plane is approximately flush with the main portion of a barrier film and/or if the common plane is approximately flush with the main surface of the core that is disposed oppositely from the filter material.

According to the invention, both barrier films are flexible, i.e., they have no shape that has been imparted to them, but instead adapt to the shape of the core. The shape of the finished insulation panel consequently depends on the shape of the core; this can be defined in particular either by pressing—into a board shape, for example—prior to wrapping in a high-barrier film and/or filter material, or pressing into almost any desired shape together with a high-barrier film and/or filter material, after having been wrapped therein.

The invention can be developed further by having one or both barrier films comprise one or more metallized layers. For example, the barrier film whose main portion is adjacent the filter material and/or whose main portion is not flush with the common plane of all portions of the fully circumferential sealing seam should consist of a metallized or transparent high-barrier film. Such a film is very supple and will not damage the ultra-thin metal layer important for maintaining the vacuum on the inside, and is therefore particularly well suited for use as the barrier film that is to be bent down to form the "hat brim."

Alternatively, at least one barrier film can consist of an aluminum composite film, particularly the barrier film whose main portion is not adjacent the filter material and/or whose main portion is approximately flush with the common plane of all portions of the fully circumferential sealing seam. An aluminum film or aluminum composite film, despite its essential flexibility, is more rigid than other film materials, and is therefore especially suitable for the layers of film disposed in or near the circumferential welding tab, since in such cases they need not be bent or folded over.

A very long-lasting internal vacuum is obtained if one, or preferably both, barrier films have a gas permeability of less than 1 $cm^3/(m^2 d)$ and/or a water vapor permeability of less than 1 $g/(m^2 d)$. These volume data are based on 1 bar of pressure and ambient temperature, and d represents the unit "day."

The invention also provides that each of the barrier films is provided with only one sealing layer. Since these sealing layers are in mutual contact in the region of the welding tab by their surfaces facing the core, it is not necessary to coat the outer face with a sealing layer.

The fully circumferential sealing seam is preferably produced in a single operation. Combining these sealings into a single operation further simplifies the production process.

It has proven beneficial if the fully circumferential sealing seam has no discernible beginning or end, and/or if the fully circumferential sealing seam has no intersections. These features are obtained by virtue of production in a single operation.

Further advantages are gained if the filter material consists of a material that can be fused together with the sealing layer of one, or preferably both, barrier films, particularly of the same material as the sealing layer of one or both barrier film(s). The filter material can, for example, consist of a nonwoven polyester fabric, which can be adhesive-bonded to the polyethylene sealing layer of the film bag under the effect of heat.

The invention is particularly suitable for the creation of one or more perforation(s) or cut-outs and/or scores in at least one barrier film. Cut-out or scored cores of this kind can be used or produced according to the invention as long as a sealing seam runs along such a cut-out or score and vacuum-tightly seals the rest of the core off from such a cut-out or score.

The invention is preferably distinguished by the presence, in each of the two barrier films, of one or more perforation(s) or cut-outs and/or scores that are approximately aligned with or overlie each other. In the case of vacuum-tight sealing along the edge of such a cut-out or score, both barrier films can be interrupted at that location, thus creating, for example, a through-insertion opening, or the like.

To effect sealing, of course, one or more sealing seams, each connecting the two barrier films to each other, should extend along one or more perforation(s) or cut-outs and/or scores.

Within the scope of the invention, a plurality of perforations or cut-outs and/or scores can exhibit the same area, thus optionally creating standardized geometries that are helpful in subsequent processing. In particular, in such a case a plurality of perforations or cut-outs and/or scores can lie in a regular grid.

If—as the invention further provides—a plurality of perforations or cut-outs and/or scores lie in a checkerboard-like grid, analogously to squares of the same color on a checkerboard, two such checkerboard-like thermal insulation elements whose top sides are oriented antiparallel can be arranged inside each other similarly to the black and white squares of a checkerboard, and thus fitted together to yield a nearly gapless overall arrangement without the risk of losing the vacuum in the entire area from a single leak, for example due to pinprick-sized damage to one high-barrier film.

The invention particularly makes it possible for a plurality of cores that are completely separated from one another to lie in a common plane between the two barrier films. This also increases the flexibility of the arrangement as a whole, since mutually separated cores are connected to each other only by the comparatively flexible films and thus can be bent relative to one another.

Taking these ideas farther, a plurality of cores having approximately the same base areas can further be provided. This measure further simplifies production, since it requires only uniform parts that can be fabricated in a process suitable for mass production.

Particularly preferred according to the invention is an arrangement in which a plurality of cores lie in a regular grid, preferably in a checkerboard-like grid, analogously to squares of the same color on a checkerboard. This makes it possible to have an arrangement where there are cut-outs in the barrier films and the filter material, specifically at the locations where the cores are absent, thus creating through-holes that pass all the way through the insulation elements, for example as through-insertion openings or the like.

The invention is also distinguished by a plurality of cores, on the one hand, that lie in a checkerboard-like grid, analogously to squares of the same color on a checkerboard, and by a plurality of through-holes or cut-outs and/or scores, on the other hand, which also lie in a checkerboard-like grid but analogously to the squares of the other color on a checkerboard, wherein the cores and through-holes or cut-outs and/or scores have approximately the same areas and/or the same cross sections. Such an embodiment affords the possibility of disposing two such mat-shaped sheet materials inside each other with their top sides oriented antiparallel to each other, such that a core of one mat engages in a through-hole or depression in the other mat, producing a nested configuration in which there are no or hardly any gaps in the arrangement as a whole. If the aluminum composite film disposed at the back in a given case has no cut-outs in the vicinity of the core through-holes, a continuous layer of aluminum composite film is additionally obtained on both sides, whereas the inner layers consist of high-barrier film with vapor-deposited metallization and thus do not form thermal bridges.

The invention recommends that one or more cores is comprised substantially of pyrogenic silicic acid, precipitated silicic acid, perlite powder, microsilica, silica from recycled plant waste, mineral powders or powdered organic materials or mixtures thereof. Suitable materials for use as powder fill are, for example, microporous silicic acid powder, perlite powder, powder made from milled open-pored organic foams or pourable glass fiber materials with short fiber lengths, and boards made from pressed powder. An opacifying agent is generally mixed into these powders to reduce thermal radiation transfer.

The invention is suitable for thermal insulation elements in which one or more cores is comprised of pressed powder. Such cores, for example board-shaped cores of this kind, can be processed without problems.

Alternatively, one or more cores can also comprise loose powder, since, owing to the filter material, no particles can be released even from a loose powder during evacuation.

The invention is also distinguished by embossed structures on one or both surfaces, serving a variety of purposes: adaptation to different thickness requirements, enhancement of flexibility in some regions, creation of receiving spaces for wrinkles forming in the high-barrier films during evacuation, etc.

If an insulation panel is provided with, for example, one or more embossed step(s) and the adjacent flat regions are of different thicknesses, then such panels can be placed next to each other overlappingly if the thinner flat areas extend along one or more edges of the panels. A preferred dimensioning in this case is a taper to about 50% of the maximum thickness of the panel, so that the sum of the two panels laid overlappingly on each other restores the original thickness of the panel.

Further advantages are provided by one or more linear or ribbon-shaped embossings, such that the evacuated sheet material can be flexed at least 5° at these embossings. An insulation panel of this kind can thereby also conform to curved surfaces, for example to drums or the like. Such a curvature can be imparted as early as during evacuation, with the result that an insulation element of this kind constantly assumes a curved shape, or in any case is very flexible due to the embossings, and can easily be bent as needed.

It is also possible to seal the two barrier films together along one or more linear or ribbon-shaped embossing(s), particularly without the inclusion of powder particles. The highest degree of flexibility is obtained in this case, so that even small radii of curvature can be created if necessary.

If such embossings extend all the way across the sheet material from one edgewise sealing seam portion to another, individual regions of the sheet material can be sealed vacuum-tightly relative to one another by this means. This leads to the desirable side effect that the pressure conditions in different areal regions are mutually independent, so that in the event of—inadvertent—aeration of a sealed subregion, at least the remaining regions will remain vacuum-tight.

The invention is particularly well suited for non-rectangular shaping, for example in connection with a shoe sole or other insulating mats, e.g. articles of clothing such as vests, as well as an extremely wide variety of other applications.

It can further be provided that the flat filter material consist of nonwoven or woven polyester, nonwoven or woven polyethylene, nonwoven or woven glass fiber, or paper. What is most important is its ability to retain particles while being permeable to gases.

The negative pressure in the evacuated sheet material can be measured from the outside by means of at least one test body or sensor disposed between the barrier films, particularly in a depression of the core. This device can be designed according to a variety of operating principles, for example as a pressure sensor that can be read from the outside, for example wirelessly, or as a heat sink, particularly behind a porous body, such that when a sudden temperature change is imparted from the external environment, the amount of energy that flows to the heat sink and must therefore be supplied from the outside, and/or its variation over time, is detected and can be used to draw conclusions concerning the pressure on the inside.

It has proven particularly beneficial in this case to dispose the test body or sensor between the core and the filter material and optionally to cover it with the filter material. In this way, the filter material penetrated by the vacuum can be tested to check its properties, particularly its thermal conductivity, thus again yielding conclusions as to the pressure conditions inside the insulation panel.

In the context of a preferred embodiment of this inventive idea, it can further be provided that a bulge in the film sheet comprises only the two barrier films and the filter material, and the gas pressure in the core can thus be determined at this location on the basis of the heat transfer through the filter material, measured from the outside. For this purpose, however, care must be taken to ensure that the particular bulge communicates with the core volume and thus is under the same pressure as the core volume per se.

A method for producing an evacuated thermal insulation element of arbitrary shape is characterized in that
loose powder or a solidified powder core is disposed on a first barrier film in such a way that the first barrier film presents a fully circumferential protrusion with respect to a first, adjacent main surface of the core or core material;
a flat filter material is laid thereover in such a way that it presents a circumferential protrusion with respect to a second main surface, adjacent the filter material, of the core or core material;
the flat filter material is connected in the region of its protrusion to the protrusion of the first barrier film in such a way that the core volume or powder volume is sealed;
the core or its core material is evacuated in a vacuum chamber to a pressure of <10 mbar;
a second barrier film is applied externally to the filter material, in such a way that it presents a fully circumferential protrusion, which protrudes beyond the second main surface of the core or core material and is connected under vacuum to the protrusion of the filter material and/or to the protrusion of the first barrier film, such that the inner volume, consisting of the powder core and the flat filter material, is sealed vacuum-tightly;
and the sheet material is removed from the vacuum chamber after aeration.

The powder can be given the desired shape, preferably by shaking and/or pressing, no later than after the powder-tight fixation, particularly gluing, of the filter material. The pressure applied for this purpose should be no more than 1 bar, if possible, to yield the lowest possible density combined with low thermal conductivity. The shaping can also be performed by means of a pressing device after evacuation and sealing in the vacuum chamber.

In another operational step, a second barrier film is laid on or against the filter material. This second barrier film can be connected to the first barrier film in places to secure it. The arrangement is evacuated in the vacuum chamber to a pressure of less than 10 mbar. The evacuation of air takes place over the entire area. The second barrier film is then connected to the first barrier film in the vacuum chamber in such a way that the inner volume, comprising the powder volume and the filter material, is sealed vacuum-tightly. The connection can be created by means of a seal arrangement that is adapted to or follows the surface contour of the vacuum insulation element.

The sealed, powder-filled film bag can also be given the desired shape before the vacuum chamber is aerated. After shaping in the vacuum chamber, the chamber is aerated, causing the vacuum panel to be compressed by the differential pressure between the internal vacuum and external atmospheric pressure and additionally stabilized; it can then be removed from the chamber. Another pressing operation could then be performed but is less recommended, since the core is hard to shape once it is in the evacuated state.

Structures can also be embossed in the vacuum panel during the pressing operation, preferably before the aeration of the vacuum chamber. It is also possible to use laid-in dies to emboss the edges with steps of different thicknesses or a rabbet. Another variant can consist in providing through-holes in the surface, at the edges of which the two barrier films are sealed. The corresponding hole in the core can be punched in advance.

During the evacuation process, the second barrier film preferably lies loosely on or against the powder core covered by the filter sheet material and is subsequently connected to the first barrier film.

It has proven beneficial to lay the second barrier film on the insulating core covered by the filter sheet material in the vacuum chamber before, during or after the evacuation process and then to connect it to the first barrier film.

The invention further provides that the connection of the first and second barrier films is produced by heat sealing their sealing layers, particularly their polyethylene layers. If the filter material consists of a material that can be fused together with these sealing or polyethylene layers, it can easily extend into the sealing layer between the two barrier films and be co-fused therein without compromising the gas-tightness of the envelope.

Finally, it is within the teaching of the invention that the heat sealing is performed with a rotary sealing device that follows the shape of the evacuated insulation element. This is a preferred variant, but not the only possible one.

BRIEF DESCRIPTION OF THE DRAWINGS

Other features, details, advantages and effects based on the invention will emerge from the following description of a preferred embodiment of the invention and by reference to the drawings. Therein:

FIG. 1 is a schematic sectional representation of the layers of a thermal insulation element according to the invention in a generally exploded representation of the element prior to its assembly;

FIG. 2 is a view corresponding to FIG. 1 of a finished thermal insulation element;

FIG. 3 is a plan view of the element of FIG. 2;

DESCRIPTION OF THE PREFERRED EMBODIMENTS

Figure 4:
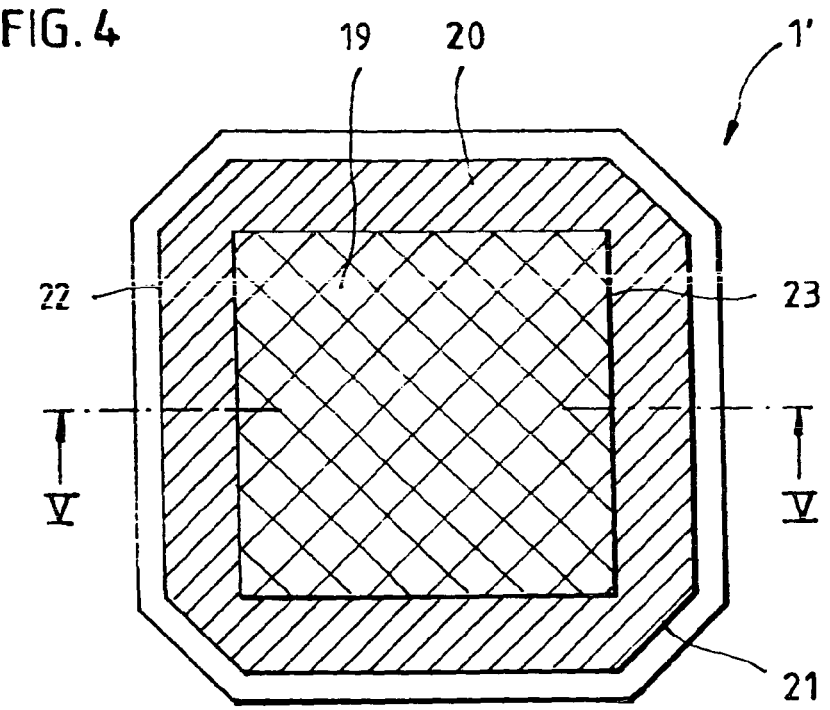
FIG. 4 is a representation corresponding to FIG. 3 of a modified embodiment of the invention.

The basic structure of the arrangement according to the invention is shown in FIG. 1.

The shape of the finished thermal insulation element 1 is determined by the shape of its core 2. This consists of a porous material, for example pyrogenic silicic acid, precipitated silicic acid, perlite powder, microsilica, silica from recycled plant waste, mineral powders or powdered organic materials or mixtures thereof. The core 2 is formed from such a powder, particularly by pressing. It can either be suitably preshaped, for example pressed to form a board, and/or cut out or stamped out, or it may not be shaped into its final form from the initially loose powder until the production method according to the invention is under way. For the following description of the basic structure, however, it should be considered to be in its final form. In addition, the core 2 need not be either cuboidal or board-shaped, but can be of any desired shape, for example curved, or it could have different thicknesses in different regions; even cut-outs or scores and through holes are feasible; its surface could also be embossed with structures, for example grooves or the like.

For the sake of simplicity, it should be assumed in the following description that the core 2 has a flat shape with a rectangular base area.

The core 2 is delimited by two oppositely disposed, preferably mutually parallel main surfaces 3, 4 and by a perimeter surface 5 extending between the main surfaces 3, 4 and consisting, for example, of four edge sides. In the simplified representation of FIG. 1, the two main surfaces 3, 4 are coincident and each two facing end faces 6, 7 are also parallel to each other, of the same size, and extend perpendicularly to the main surfaces 3, 4. The core 2 thus has a constant thickness D and a circumference U measured along the edge of a main surface 3, 4. Whereas each main surface 3, 4 has an area $F_H$, the perimeter surface 5, i.e., the sum total of the areas of all the edge faces 6, 7, has an area $F_U$ whose value is $F_U = U \cdot D$.

In the finished state, the core 2 of the thermal insulation element 1 is completely enveloped, specifically in a gas-tight manner, so that the vacuum is maintained in the enclosed volume for many years.

To this end, a first barrier film 8 extends along one main surface 3, in FIG. 1, along the bottom surface. This first barrier film 8 is larger in area than the associated main surface 3 of the core 2, thus creating a protrusion 9 having a width Ü, i.e., having the areal dimension $F_Ü = U \cdot Ü + 4 \cdot Ü^2$; the area $F_{B1}$ of the first barrier film 8 is therefore given by $F_{B1} = F_H + F_Ü = F_H + U \cdot Ü + 4 \cdot Ü^2$. The fully circumferential protrusion 9 has, for example, a width Ü of between 3 mm and 30 mm, preferably between 4 mm and 20 mm, particularly between 5 mm and 15 mm.

The first barrier film 8 preferably comprises an aluminum composite film on whose inner face 10, facing the core 2, is disposed a sealing layer, preferably of polyethylene.

Extending along the opposite main surface 4 of the core 2 is a flat filter material 11, for example in the form of a nonwoven or woven fabric, particularly made from polyester, polyethylene, polyolefin, glass fiber and/or paper. It is crucial that this be air-permeable, but still able to retain all the powder grains of the core 2. The area $F_{FM}$ of this filter material 11 is greater than the area $F_H$ of the associated core main surface 4 and greater than the area $F_{B1}$ of the first barrier film 8; specifically, $F_{FM} = F_{B1} + \Delta F$. Extending along the outer face 12 of the filter material 11 is a second barrier film 13 whose area $F_{B2}$ is approximately equal to the area $F_{FM}$ of the filter material 11: $F_{B2} = F_{FM} = F_{B1} + \Delta F$.

Given that the two barrier films 8, 13 must meet no later than at the peripheral margin of the protrusion 9 in order to tightly enclose the inner cavity, then, according to the Pythagorean theorem, the protrusion X of the second barrier film 13, in the case of the shortest, cross-sectional connection of the top edge of the core to the peripheral margin of the first film 8, is equal to: $X^2 = D^2 = Ü^2$, i.e., a minimum protrusion $X = (D^2 + Ü^2)^{1/2}$. It follows that $\Delta F \geq U \cdot [(D^2 + Ü^2)^{1/2} - Ü]$, hence $\Delta F \geq U \cdot U Ü \cdot [(D^2/Ü^2 + 1)^{1/2} - 1] = U \cdot Ü \cdot [W-1]$. The root W becomes minimal when $D/Ü \to 0$. There, W can be developed into a Taylor series and interrupted after the quadratic term: $W = 1 + \frac{1}{2} \cdot [D/Ü]^2 + \ldots$ In the formula used above, this yields $\Delta F \geq \frac{1}{2} \cdot U \cdot D \cdot D/Ü = \Delta F_{min}$, i.e., an estimate of the required area $\Delta F_{min}$ that must additionally be provided in the case of the second film 13, as the minimum necessary so that the film 13 is not overstretched and thus not damaged. This patent formula for determining $\Delta F_{min}$ is very important for the production of evacuated sheet materials with an intended life expectancy of many years.

The second barrier film 13 preferably comprises a metallized plastic film with a sealing layer at its inner face 14.

As can be seen in FIG. 2, in the finished state the core 2 lies flat against the inner face 10 of the first barrier film 8, maintaining a fully circumferential protrusion 9 of the barrier film 8 of approximately constant width Ü. The flat filter material 11 covers the core 2 and the protrusion 9 of the barrier film 8.

It is topped by the second barrier film 13, which is roughly coincident with the filter material 11. Extending along the protrusion 9 is a fully circumferential sealing seam 15, into which the filter material 11 is preferably co-welded. The entire sealing seam 15 is preferably created in a single operation and therefore has no discernible beginning or end, nor does it have any intersections, or the like.

As can further be seen from FIGS. 2 and 3, given this basic principle, the thermal insulation element 1 can readily be provided with steps 16 and/or through holes 17. These can, for example, be created in the core 2 in advance and are then present in the finished product. In the case of through holes 17, each must be provided with a sealing seam 18 running along its edge so that the volume inside the thermal insulation element 1 is sealed air-tight. The area radially inside such a sealing seam 18 can then readily be cut out of the two barrier films 8, 13.

FIG. 4 discloses another thermal insulation element 1', by means of which an area can be laid without gaps despite the lateral protrusion 9'.

For this purpose, the thermal insulation element 1' has two regions of different thickness: In a central region 19, the core 2' has a thickness D, whereas at the periphery, a circumferential edge region 20 has a thickness of only D/2. The central region 19 encompasses a rectangular or even square base area, whereas the outer periphery of the core 2', i.e., including the outer periphery of its edge region 20, has an octagonal shape, with corner regions 21 beveled at about 45°, while the edges 22 between them have approximately the same length as the associated edge 23 of the central region 19.

As in the first embodiment 1, the core 2' is covered on one side by a layer of a filter material 11 and is wrapped in two gas-tight barrier films 8' and 13'.

Figure 5:
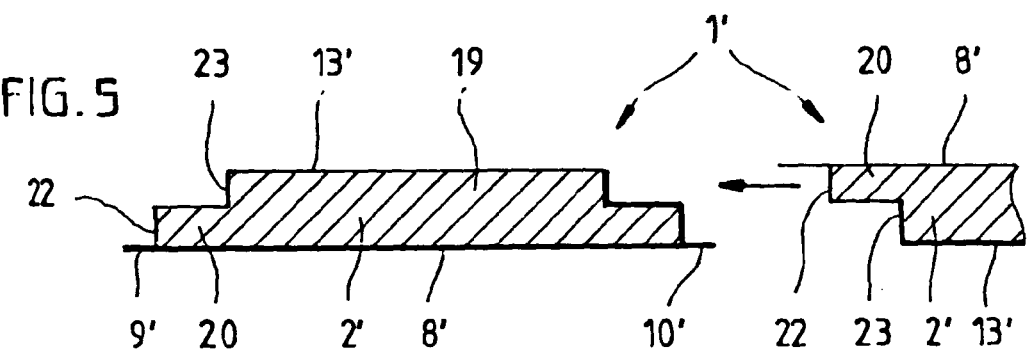
FIG. 5 is a section through FIG. 4 along line V-V, indicating assembly with other, similar thermal insulation elements.

As can be learned from FIG. 5, another thermal insulation element 1' of the same design can be disposed upside down at any edge 22 of such a thermal insulation element 1'. A respective thermal insulation element 1' can then be disposed right side up at the other three sides of each of these inverted thermal insulation elements 1', and so on. A surface can be laid largely without gaps in this way.

Figure 6:
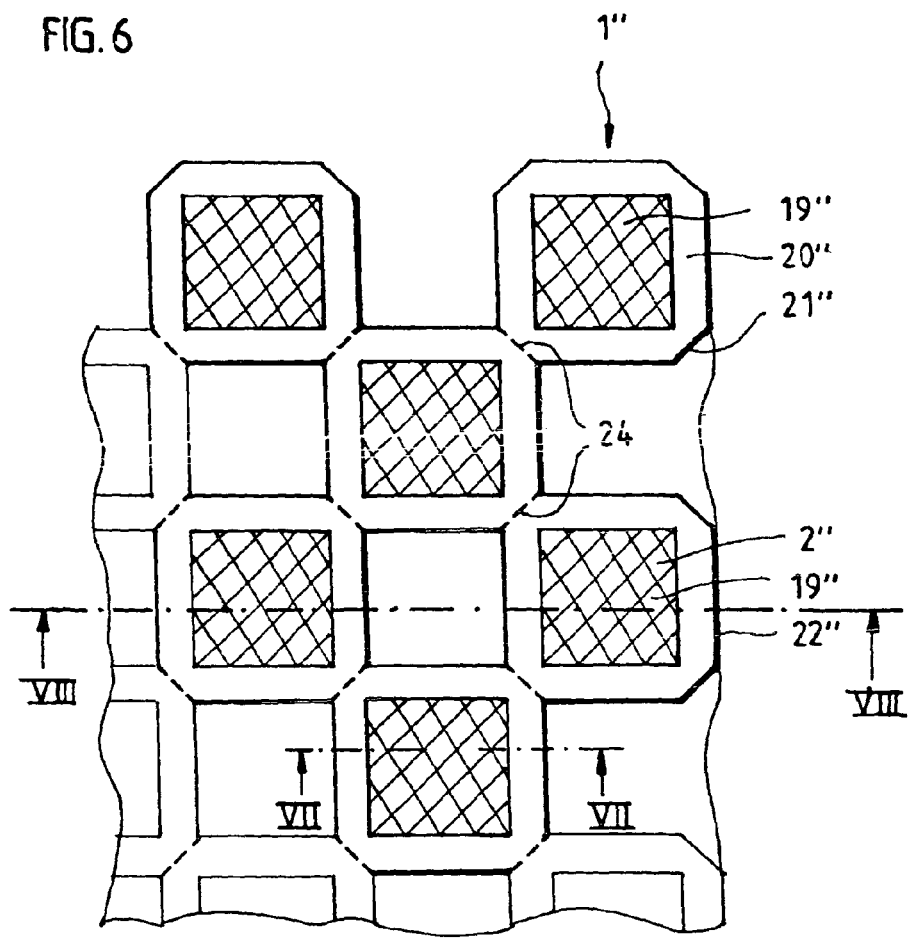
FIG. 6 shows a further-modified, mat-shaped embodiment of the invention in a representation corresponding to FIG. 4.
Figure 7:
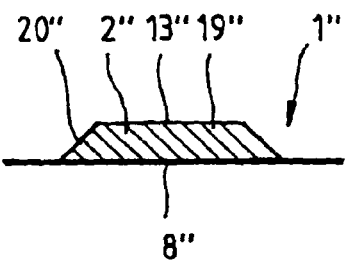
FIG. 7 is a section through FIG. 6 along line VII-VII.

This principle is refined further in the arrangement according to FIGS. 6 and 7. Here, plural cores 2" are covered on one side with a shared filter material 11" and are welded in vacuum-tightly between two barrier films 8", 13". The cores each have a flat shape, with a rectangular or even square central region 19" and an edge region 20" having an octagonal periphery and a reduced thickness. As FIG. 7 shows, the thickness decreases approximately linearly from the central region to the periphery of the edge region 20", such that a core 2" of this kind has, overall, approximately the shape of a frustum of a pyramid, the corner regions of the core 2" being cut off, as indicated by the dashed lines 24 in FIG. 6. The individual cores 2" are preferably spaced a small distance apart along these lines 24, so a sealing seam can be provided at that location. As a result, the regions of all the subcores 2" are sealed off from one another air-tightly, and should a barrier film 8", 13" become damaged in the region of a core 2", this will not affect the other core regions 2".

Figure 8:
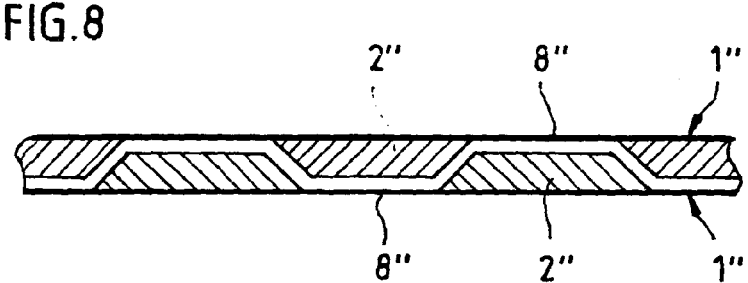
FIG. 8 is a section through FIG. 6 along line VIII-VIII, together with a second thermal insulation element of the same design, which is inverted, with its top sides facing down, so that they can engage in the depressions in the bottom mat.

The regions between every four cores 2" can be cut out of the two films 8", 13". This is not mandatory, however. The invention also provides instead that the film regions between every four cores 2" are not cut out. As FIG. 8 shows, with embodiments of this kind it is also possible to arrange two such mats 1", each having a plurality of cores 2", inside each other in such a way that a respective core region 2" of one mat 1" engages in the depression between each group of four cores 2" of the other mat 1". This is possible particularly by flipping one mat 1" over 180° with respect to the other one, so that its top side (i.e., for example, its second barrier film layer 13") is on the bottom and its bottom side (i.e., for example, its first barrier film layer 8") is on top. If necessary, individual cores 2" could be separated from such a mat, particularly by being cut out along the adjacent sealing-seam lines 24.

In the context of another application, a vacuum panel produced according to the described inventive method can, for example, have the shape of a shoe insole, with a thickness of approximately 3 mm, and optionally with one or more scores in the surface to permit constant slight flexure of the insole during walking, without causing damage to the envelope films.

The invention claimed is:

1. An evacuated sheet material for thermal insulation, the sheet material comprising
    a) at least one flat core of an open-pored material having a first main surface and a second main surface which extend approximately parallel to each other, and a fully circumferential perimeter region connecting the first and second main surfaces to each other,
    b) a first barrier film in flat, areal contact with the first main surface of said core and comprising at least one sealing layer facing said core, as well as a fully circumferential protrusion of said first barrier film with respect to said first main surface of said core,
    c) a flat filter material that is in flat, areal contact with the second main surface of said core facing away from said first barrier film and presents a fully circumferential protrusion with respect to a second main surface of said core,
    d) a second barrier film in flat, areal contact with an outer face of said flat filter material and comprising a sealing layer facing said flat filter material, as well as a fully circumferential protrusion of said second barrier film with respect to the second main surface of said core,
    e) a sealing seam that extends fully circumferentially along the protrusions of said first and second barrier films and fixes said first and second barrier films to each other,
    f) wherein said filter material is welded fully circumferentially into said sealing seam between said first and second barrier films in such way, that the region of said sealing seam has a three-layer structure having three directly adjacent layers, namely i) the first barrier film as a first envelope film, ii) the flat filter material, and iii) the second barrier film as a second envelope film, wherein the filter material, as a middle component of this three-layer structure, passes all the way through the sealing seam, from an evacuated interior of the evacuated sheet material to the surrounding external space, which is under atmospheric pressure, and, in the region of the sealing seam, completely separates the first and second barrier films from each other, in such way that, precisely in the sealing seam, the first and second barrier films are not in any direct contact with each other, but are always separated from each other,
    g) and wherein a volume between said first and second films and said fully circumferential sealing seam, consisting of said core and an inner portion of said filter material, is sealed vacuum-tightly and evacuated.

2. The evacuated sheet material as in claim 1, wherein one of said barrier films is provided with a greater area than the other of said barrier films.

3. The evacuated sheet material as in claim 1, wherein said second barrier film, which is in flat, areal contact with said filter material, is larger than said first barrier film, which is in contact with said core.

4. The evacuated sheet material as in claim 1, wherein a cross section through said core wrapped in said barrier films is generally hat-shaped.

5. The evacuated sheet material as in claim 1, wherein all portions of said fully circumferential sealing seam lie in a common plane, the common plane being generally flush with an opposite main surface of said core from said filter material.

6. The evacuated sheet material as in claim 1, wherein said first or second barrier film whose main portion is flush with a common plane of all portions of said fully circumferential sealing seam comprises a multi-layer aluminum composite film.

7. The evacuated sheet material as in claim 1, wherein said first or second barrier film whose main portion is not flush with a common plane of all portions of the fully circumferential sealing seam comprises a metallized or transparent barrier film.

8. The evacuated sheet material as in claim 1, wherein a barrier film that is in contact with said filter material is flexible and adapts to the shape of said core.

9. The evacuated sheet material as in claim 1, wherein said fully circumferential sealing seam is adapted to be produced in a single operation.

10. The evacuated sheet material as in claim 9, wherein said fully circumferential sealing seam has no discernible beginning or end.

11. The evacuated sheet material as in claim 9, wherein said fully circumferential sealing seam has no intersections.

12. The evacuated sheet material as in claim 1, wherein the filter material comprises the same material as a sealing layer of a barrier film.

13. The evacuated sheet material in accordance with claim 1, wherein one or more through hole(s) or cut-outs and/or scores are disposed in at least one of said first and second barrier films, or at least one or more through hole(s) or cut-outs and/or scores are disposed in each of said barrier films that are generally aligned with or overlie one another.

14. The evacuated sheet material in accordance with claim 13, wherein extending along one or more of the through holes, or cut-outs, and/or scores, are one or more sealing seams, each of which connects said first and second barrier films to each other.

15. The evacuated sheet material in accordance with claim 13, wherein a plurality of through holes, or cut-outs, and/or scores that are disposed in a regular grid, particularly in a checkerboard-like grid, analogously to squares of a same color on a checkerboard, are generally of the same area.

16. The evacuated sheet material in accordance with claim 1, wherein a plurality of cores completely separated from one another, by sealing seams, are disposed in a common plane between said first and second barrier films.

17. The evacuated sheet material in accordance with claim 16, wherein a plurality of said cores disposed in a checkerboard-like grid, analogously to squares of a same color on a checkerboard, and wherein the plurality of cores are provided with generally a same base area.

18. The evacuated sheet material in accordance with claim 1, wherein a) a grid-like core structure is provided with a plurality of cores, or elevated portions thereof, disposed in a checkerboard-like grid, analogously to squares of a same color on a checkerboard, and are separated from one another by a plurality of through holes, or cut-outs, and/or scores, or core depressions, b) wherein the cores, or elevated portions thereof, and through holes or cut-outs, and/or scores or core depressions, are configured such that a sheet material of this kind is adapted to engage in through holes, or cut-outs, and/or scores or depressions, of a sheet material of like design turned upside down such that its top side faces downward, c) wherein there are substantially no gaps in the arrangement, as a whole.

19. The evacuated sheet material as in claim 1, comprising a plurality of cores and a plurality of through holes, wherein a base area of one of the plurality of cores corresponds to a base area of one of the plurality of through holes.

20. The evacuated sheet material as in claim 18, wherein one or more cores are comprised of loose powder or pressed powder.

21. The evacuated sheet material as in claim 1, wherein embossed structures are disposed on one or both surfaces of said two main surfaces.

22. The evacuated sheet material as in claim 21 and further comprising one or more embossed stepped discontinuity (-ies), wherein different regions adjacent thereto at different sides of one of the stepped discontinuity (-ies) are of different thickness.

23. The evacuated sheet material as in claim 22, and further comprising one or more linear or ribbon-shaped embossings, wherein these embossings allow the evacuated sheet material to be flexed at least 5° at said embossings.

24. The evacuated sheet material as in claim 23, wherein said one or more linear or ribbon-shaped embossing(s) along the two barrier films are sealed to each other without inclusion of powder particles.

25. The evacuated sheet material as in claim 24, wherein said embossings extend across the sheet material from one edgewise welding seam portion to another and thereby seal individual regions of the sheet material off from one another tightly.

26. The evacuated sheet material as in claim 21, wherein said first and second main surfaces are not rectangular.

27. The evacuated sheet material as in claim 1, and further comprising a selected one of (1) at least one test body disposed between the barrier films in a depression of the core whose thermal conductivity depends on the gas pressure, and (2) a sensor for measuring the pressure in the evacuated sheet material from the outside.

28. The evacuated sheet material as in claim 1, wherein a bulge in said sheet material comprises only said first and second barrier films and said filter material, and a gas pressure in said core, if any, can be determined at that location on the basis of heat transfer through said filter material, measured from outside of said sheet.

* * * * *